(12) United States Patent
Irwin

(10) Patent No.: US 9,476,542 B2
(45) Date of Patent: Oct. 25, 2016

(54) DRIP CONTAINMENT APPARATUS, SYSTEM, AND METHOD

(71) Applicant: Brian P. Irwin, Nashville, IN (US)

(72) Inventor: Brian P. Irwin, Nashville, IN (US)

( * ) Notice: Subject to any disclaimer, the term of this patent is extended or adjusted under 35 U.S.C. 154(b) by 0 days.

(21) Appl. No.: 14/811,452

(22) Filed: Jul. 28, 2015

(65) Prior Publication Data

US 2016/0097483 A1   Apr. 7, 2016

Related U.S. Application Data

(62) Division of application No. 14/506,614, filed on Oct. 4, 2014, now Pat. No. 9,127,801.

(51) Int. Cl.
*B67C 11/00* (2006.01)
*F16M 13/02* (2006.01)

(52) U.S. Cl.
CPC ............... *F16M 13/02* (2013.01); *B67C 11/00* (2013.01)

(58) Field of Classification Search
CPC .............................. F16M 13/02; B67C 11/00
USPC ..................... 141/1, 85–88, 311 A, 340–342
See application file for complete search history.

(56) References Cited

U.S. PATENT DOCUMENTS

| | | | | |
|---|---|---|---|---|
| 3,654,969 A * | 4/1972 | Vazquez | ................. | B67C 11/00 141/106 |
| 4,022,257 A * | 5/1977 | O'Connell | ............ | F16N 31/002 141/314 |
| 4,402,401 A * | 9/1983 | Leno | ....................... | B67C 11/00 141/86 |
| 4,515,188 A * | 5/1985 | Brutsman | .................. | B67B 7/28 141/1 |
| 4,706,719 A * | 11/1987 | Eversdijk | ................ | B67C 11/02 141/337 |
| 4,789,017 A * | 12/1988 | Panasewicz | ............ | B67C 11/02 141/311 R |
| 4,832,095 A * | 5/1989 | Bonnell | ................ | B65D 71/502 141/106 |
| 5,269,354 A * | 12/1993 | Koberg | ................ | B65D 71/502 141/106 |
| 5,291,921 A * | 3/1994 | Devine | ................. | B09B 3/0058 141/106 |
| 5,505,295 A * | 4/1996 | Whittington | ........... | B01D 41/04 141/86 |
| 5,970,562 A * | 10/1999 | Lalevee, Sr. | ........... | A46B 15/00 15/167.1 |
| 6,555,069 B1 * | 4/2003 | Ferguson | ................... | F23D 3/24 239/44 |
| 6,962,174 B1 * | 11/2005 | Trantham | ................... | B08B 9/08 141/106 |
| D560,105 S * | 1/2008 | McKenzie | .................... | D15/150 |
| 7,431,056 B1 * | 10/2008 | Smith | ...................... | F16N 33/00 141/1 |
| 7,469,784 B1 * | 12/2008 | Bower | .................. | F16N 31/002 141/319 |
| 9,127,801 B1 * | 9/2015 | Irwin | ....................... | B07B 13/14 |
| 2002/0007866 A1 * | 1/2002 | Swan | ....................... | B67C 11/02 141/86 |
| 2004/0108016 A1 * | 6/2004 | Saks, III | ............... | F16N 31/002 141/106 |

* cited by examiner

*Primary Examiner* — Nicolas A Arnett
(74) *Attorney, Agent, or Firm* — Roberts IP Law; John Roberts

(57) ABSTRACT

Provided is a drip containment apparatus that in certain example embodiments may comprise a ceramic body having a glazed exterior surface and an unglazed interior surface defining a cavity therein, and an aperture defining an opening from the exterior surface to the interior surface, the aperture and interior surface being adapted to receive therein a distal portion of a funnel and to support the funnel so that residual fluid inside the funnel will tend to drip into the interior of the ceramic body and be absorbed into the ceramic body but not leak through the glazed exterior surface. A support structure may be provided to support the ceramic body while it is holding the funnel. The ceramic body may be ornamental in appearance. In one embodiment the ceramic body is adapted to be hung on a wall during use.

10 Claims, 4 Drawing Sheets

DRIP CONTAINMENT APPARATUS, SYSTEM, AND METHOD

CROSS-REFERENCE TO RELATED APPLICATIONS

This application claims priority to, incorporates by reference, and is a divisional of U.S. Ser. No. 14/506,614 filed Oct. 4, 2014.

FEDERALLY SPONSORED RESEARCH OR DEVELOPMENT

None.

TECHNICAL FIELD

The present invention relates generally to the containment of drips from an item dripping a liquid, and more particularly to the containment of drips from funnels and funnel-like devices.

BACKGROUND

Funnels and funnel-like devices have been used for centuries. Useful for transferring liquids and granulated materials into containers with smaller mouths or openings, funnels prevent spillage and loss. The term 'funnel' itself has a unique etymology dating to the 1400's and can be used as both a noun and a verb. Earliest forms of the word include the Latin 'infundibulum', derivative of 'infundere' meaning 'to pour in', later adapted to the wine trade of southern France as 'enfounilh'. As shown in FIG. 1, a typical funnel 100 may comprise a longitudinally-extending pipe with a wide, often conical mouth portion 110 at a proximal end leading to a narrower, often tapered stem portion 120 at a distal end. Funnels are usually made of stainless steel, aluminum, glass, or plastic, but may be formed from any suitable material. In use, a liquid may be poured into the large open mouth portion 110 as indicated by arrow 200, and flow down the interior wall(s) 115 of the funnel 100 and out the smaller opening (not shown at this angle) of the distal end 130 of the stem portion 120.

Once a funnel 100 has been used, however, a problem often arises: where to put the funnel 100 until it dries out and stops dripping the liquid 210 from the distal end 130. Often the liquid being funneled is dirty or toxic, such as oil, fuel, other petroleum-based products, or chemicals. In these cases the user typically does not want to touch the liquid, and it can be nearly impossible to try to manually use a rag, cloth, or paper towel to wipe out all the liquid from the interior surface(s) 115 of a funnel 100, because the stem portion 120 is frequently too long and narrow to reach inside. Moreover, with viscous liquids such as oil and other petroleum-based products, a thin layer of the liquid tends to adhere to the interior surface(s) 115 of the funnel 100, thus often taking a very long time to drip-dry. Very frequently in typical use, a funnel 100 is hung on a wall or put on a shelf or other location before it is completely dry, and over time the liquid 210 continues to slowly drip out of the distal end 130 of the funnel 100, often causing unsightly stains and puddles that may also be flammable and toxic.

Accordingly, there has been a long-felt need for a simple, safe, inexpensive, and visually pleasing way to store funnels after use.

SUMMARY

The present invention elegantly addresses all the above challenges and provides numerous additional benefits. In various example embodiments the solution discovered by the present inventor may comprise a drip containment apparatus, system, and method, examples of which are shown and described. For example, provided in various example embodiments is a drip containment apparatus, comprising: a ceramic body having a glazed exterior surface and an unglazed interior surface defining a cavity therein, and an aperture defining an opening from the exterior surface to the interior surface, the aperture and interior surface adapted to receive therein a distal portion of a funnel and to support the funnel so that residual fluid inside the funnel will tend to drip into the interior of the ceramic body and be absorbed into the ceramic body but not leak through the glazed exterior surface. In various example embodiments a drip containment apparatus may further comprise: the ceramic body comprising a longitudinally extending base and a neck extending outward from the base at a non-right angle relative to the base, the neck comprising the aperture and the cavity. In various example embodiments a drip containment apparatus may further comprise: the ceramic body adapted to be hung on a wall during use with the longitudinally extending base against the wall and the neck angled upward and adapted to support the funnel. In various example embodiments a drip containment apparatus may further comprise: the ceramic body comprising an ornamental shape. In various example embodiments a drip containment apparatus may further comprise: the aperture being substantially round. In various example embodiments a drip containment apparatus may further comprise: the interior surface being substantially round. In various example embodiments a drip containment apparatus may further comprise: the aperture and the interior surface having substantially the same profile.

Further provided in various example embodiments is a drip containment system, comprising: a ceramic body having a glazed exterior surface and an unglazed interior surface defining a cavity therein, and an aperture defining an opening from the exterior surface to the interior surface, the aperture and interior surface adapted to receive therein a distal portion of a funnel so that residual fluid inside the funnel will tend to drip into the interior of the ceramic body and be absorbed into the ceramic body but not leak through the glazed exterior surface; a support structure adapted to support the ceramic body and funnel when the distal portion of the funnel is received in the aperture and interior surface of the ceramic body. In various example embodiments the drip containment system of claim may further comprise: the ceramic body comprising a longitudinally extending hollow cylinder with the aperture formed in an upper surface thereof. In various example embodiments the drip containment system of claim may further comprise: the ceramic body comprising an external profile, and the support structure being adapted to supportably engage the external profile. In various example embodiments the drip containment system of claim may further comprise: the aperture being substantially round. In various example embodiments the drip containment system of claim may further comprise: the interior surface being substantially round. In various example embodiments the drip containment system of claim may further comprise: the support structure comprising an ornamental shape.

Also provided in various example embodiments is a method of containing drips, comprising the steps of: providing a ceramic body having a glazed exterior surface and an unglazed interior surface defining a cavity therein, and an aperture defining an opening from the exterior surface to the interior surface, the aperture and interior surface adapted to receive therein a distal portion of a funnel so that residual fluid inside the funnel will tend to drip into the interior of the ceramic body and be absorbed into the ceramic body but not leak through the glazed exterior surface; providing a funnel containing residual fluid that tends to drip from a distal portion of the funnel; and placing the distal portion of the funnel through the aperture and into the cavity so that the residual fluid tends to drip from the distal portion of the funnel into the cavity. In various example embodiments the method may further comprise the step(s) of: positioning the funnel so that it is supported by the ceramic body. In various example embodiments the method may further comprise the step(s) of: positioning the funnel so that it is supported by the aperture and the interior surface of the ceramic body. In various example embodiments the method may further comprise the step(s) of: providing a support structure adapted to support the ceramic body and funnel when the distal portion of the funnel is received in the aperture and interior surface of the ceramic body; positioning the ceramic body, support structure, and funnel so that the funnel is supported. In various example embodiments the method may further comprise the step(s) of: replacing the ceramic body when it becomes substantially saturated; and repeating the foregoing steps with the same support structure. In various example embodiments the method may further comprise the step(s) of: hanging the ceramic body on a wall and using it as-described while it is hanging on the wall. In various example embodiments the method may further comprise the step(s) of: recycling the ceramic body when it becomes substantially saturated.

Example embodiments are shown and described in this patent application in the accompanying written description and figures. Additional aspects, alternatives and variations as would be apparent to persons of skill in the art are also disclosed herein and are specifically contemplated as included as part of the invention. The invention is set forth only in the claims as allowed by the patent office in this or related applications, and the foregoing summary descriptions of certain examples are not in any way to limit, define or otherwise establish the scope of legal protection.

BRIEF DESCRIPTION OF THE DRAWINGS

The accompanying figures illustrate certain aspects of example embodiments of the invention.

DETAILED DESCRIPTION OF EXAMPLE EMBODIMENTS

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

Figure 1:
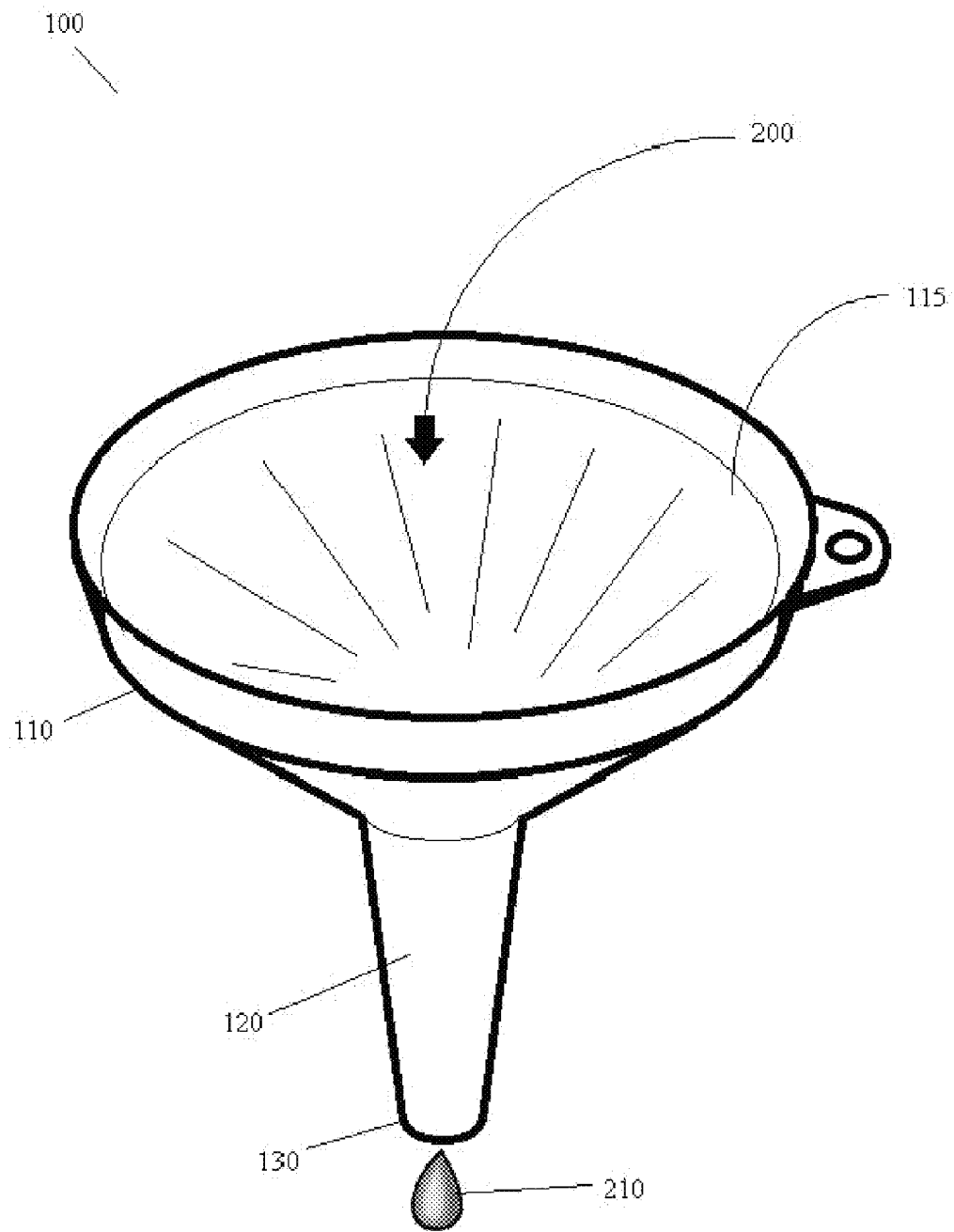
FIG. 1 is top perspective view of a typical funnel as described in the Background.
Figure 2A:
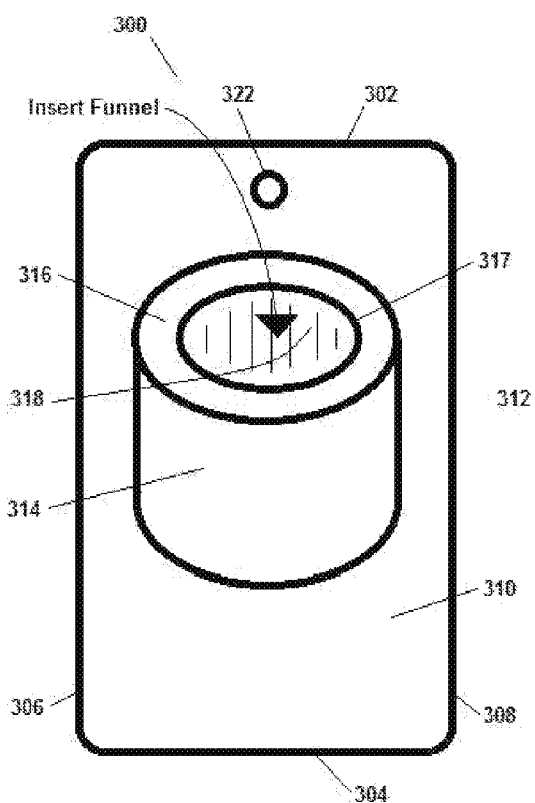
FIG. 2A is a front elevation view of one example embodiment of a drip containment apparatus.
Figure 2B:
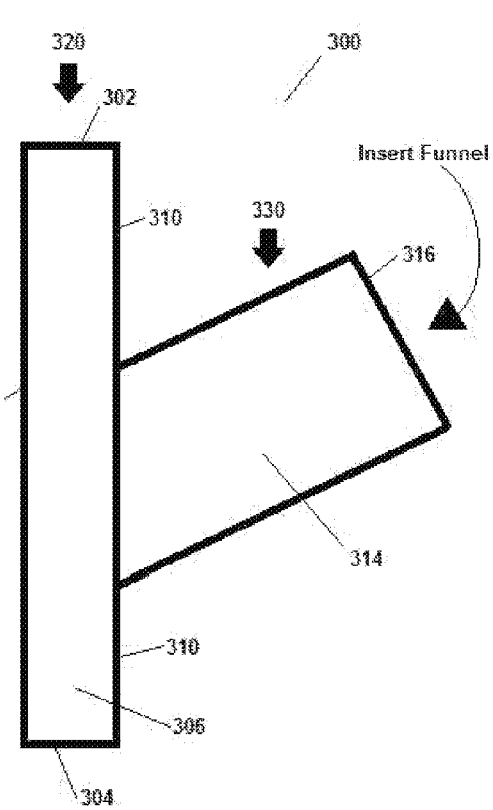
FIG. 2B is a left-side elevation view of the example embodiment of FIG. 2A.

Shown in FIGS. 2A and 2B is one example embodiment of a drip containment apparatus, comprising a ceramic body 300 having a longitudinally extending base 320 and a neck 330 extending outward from the base 320 at a non-right angle relative to the base 320, the neck 330 comprising an aperture 317 and a cavity defined by interior surface 318. In this example the aperture 317 and interior surface 318 are both provided with the same substantially round profile (shown elliptical due to oblique view angle). However any suitable shapes or profiles that will sufficiently support the desired funnels may be used. The exterior surface of the body 300 may be largely or entirely glazed to prevent liquid leakage there through, including for example top surface 302, bottom surface 304, left side surface 306, right side surface 308, front surface 310, back surface 312, outer neck surface 314, and upper neck surface 316 (collectively, an example of "glazed exterior surfaces"). The cavity defined by interior surface 318, including the base thereof (not visible in FIGS.), is at least partially unglazed and may be substantially entirely unglazed, and thus is at least partially porous and absorbent of liquids. The aperture 317 and interior surface 318 are adapted to receive therein a distal portion 130 of a funnel, for instance non-limiting example funnel 100 shown in FIG. 1, and to support the funnel 100, for instance by supporting at least a portion of stem portion 120, so that residual fluid 210 on the interior surface(s) 115 of the funnel 100 will tend to drip into the interior 318 of the ceramic body 300 and be absorbed into the porous ceramic body 300 but not leak through the glazed exterior surfaces, which are essentially like glass once glazed. Example ceramic body 300 is adapted to be hung and used as described herein with its back side 312 against a wall or the like, and means may be provided, such as a through hole 322, by which to hang it.

Figure 3:
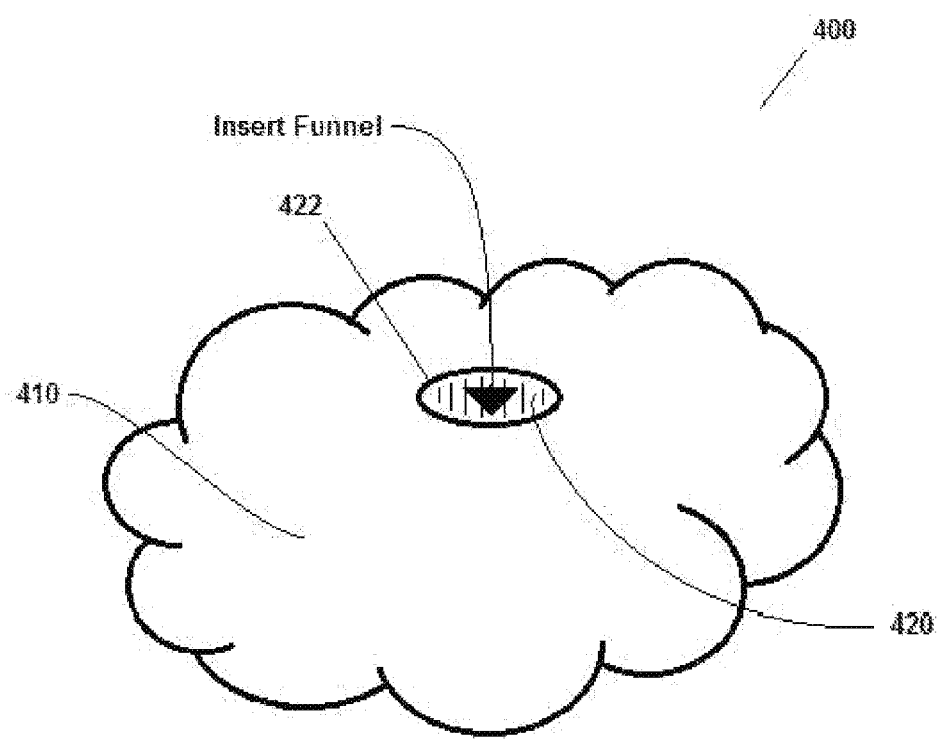
FIG. 3 is a top perspective view of another example embodiment of a drip containment apparatus, conceptually illustrating that any possible shape may be used.

Turning to FIG. 3, provided is another example embodiment of a drip containment apparatus, comprising a ceramic body 400 having a glazed external surface 410 and in an upper portion thereof an aperture 422 into a cavity defined at least in part by unglazed internal surface 420. FIG. 3 is provided to make the conceptual point that the ceramic body 400 can be almost any three-dimensional shape one could imagine, including ornamental shapes, due to the versatility of ceramic materials. For example and not by way of limitation, ceramic body 400 could be formed into the shape or appearance of cars, trucks, motorcycles, oil cans, statuettes and other figures, as well as architectural ornaments, pottery or other vessels, pipes, pitchers, canteens, pots, vases, masks, bowls, and the like.

Figure 4:
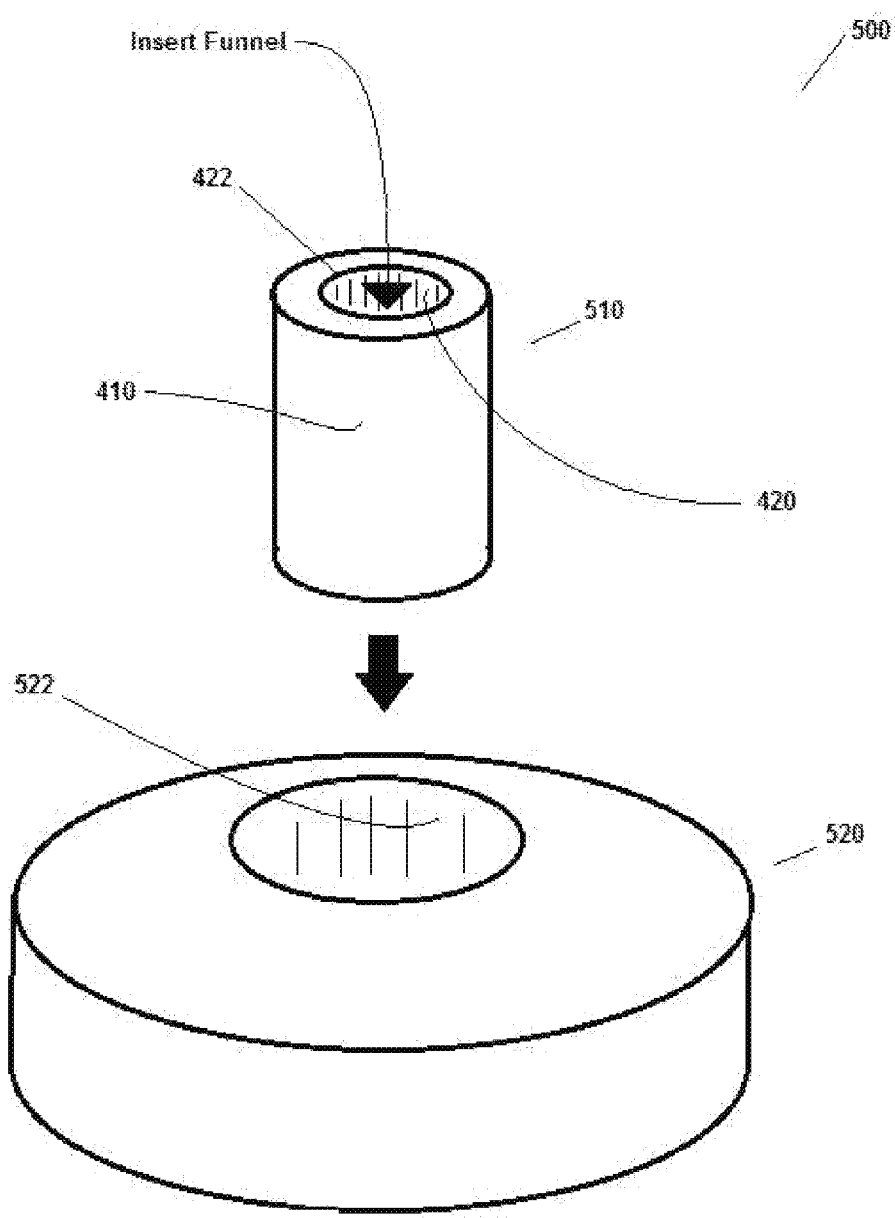
FIG. 4 is a top perspective exploded view of an example embodiment of a drip containment system.

With reference to FIG. 4, provided in various example embodiments is a drip containment system 500, comprising a ceramic body 510 having a glazed exterior surface 410 and an unglazed interior surface 420 defining a cavity therein, and an aperture 422 defining an opening from the exterior surface 410 to the interior surface 420. The aperture 422 and interior surface 420 are adapted to receive therein a distal portion 130 of a funnel 100 so that residual fluid 210 inside the funnel will tend to drip into the interior 420 of the ceramic body 510 and be absorbed into the ceramic body 510 but not leak through the glazed exterior surface 410. Also provided is an example of a support structure 520 adapted to support the ceramic body 510 and funnel 100 when the distal portion 130 of the funnel 100 is received in the aperture 422 and interior surface 420 of the ceramic body 510. The ceramic body 510 in this example comprises a longitudinally extending hollow cylinder with a substantially round aperture 422 formed in an upper surface thereof (shown elliptical due to oblique view angle). The ceramic body 510 comprises an external profile 410, in this case a substantially round cylinder, and the support structure 520 comprises a relatively large and stable platform having a substantially round hole there through with side(s) 522 adapted to supportably engage the external profile 410 of the ceramic body 510. In this type of embodiment the support structure 520 may be formed in any desired shape that will provide support for the ceramic body 510 and a funnel 100, including any type of ornamental shape. For example but not by way of limitation, support structure 520 may comprise one or more plastic or metal sheets or other structures formed into a sign that could provide a surface for advertising, or an ornamental shape such as flames. Support structure 520 is shown as a generic round disk to illustrate that the invention is not limited to any particular shape, as long as it is adapted to function as claimed.

In use, an example method of containing drips may comprise using any of the apparatus or systems 300, 400, or 500 by providing a funnel 100 containing residual fluid 210 that tends to drip from a distal portion 130 of the funnel 100, and placing the distal portion 130 of the funnel 100 through the aperture 317, 422, and into the cavity 318, 420, so that the residual fluid 210 tends to drip from the distal portion 130 of the funnel 100 into the cavity 318, 420. In various example embodiments the method may further comprise the step of positioning the funnel 100 so that it is supported by the aperture 317, 422, and the interior surface 318, 420, of the ceramic body 300, 400, 510. In various example embodiments the method may further comprise the step of providing a support structure 520 adapted to support the ceramic body 510 and funnel 100 when the distal portion 130 of the funnel 100 is received in the aperture 422 and interior surface 420 of the ceramic body 510, and positioning the ceramic body 510, support structure 520, and funnel 100 so that the funnel is supported, for instance as indicated by the arrows in FIG. 4.

Additionally, a user may replace the ceramic body 300, 400, or 510 when it becomes substantially saturated, while keeping the same support structure 520. Alternatively, a user may recycle the ceramic body 300, 400, or 510 when it becomes substantially saturated, for instance by taking it to an appropriate hazardous waste recycling center or by re-firing the body under the glazing conditions noted herein, which have been found to boil off or otherwise evacuate the drippings from the ceramic body.

As used herein, the term ceramic is meant to have its common meaning as used in the field of pottery and ornamental ceramics that can be formed by hand by artists, as well as via high-volume manufacturing methods. In general, a ceramic material is an inorganic, non-metallic, often crystalline oxide, nitride or carbide material. Some elements, such as carbon or silicon, may be considered ceramics. Ceramic materials are brittle, hard, strong in compression, weak in shearing and tension. They withstand chemical erosion that occurs in other materials subjected to acidic or caustic environments. Ceramics generally can withstand very high temperatures, such as temperatures that range from 1,000° C. to 1,600° C. (1,800° F. to 3,000° F.). A glass is often not understood as a ceramic because of its amorphous (noncrystalline) character. However, glassmaking involves several steps of the ceramic process and its mechanical properties are similar to ceramic materials.

Traditional ceramic raw materials include clay minerals such as kaolinite, whereas more recent materials include aluminum oxide, more commonly known as alumina. The modern ceramic materials, which are classified as advanced ceramics, include silicon carbide and tungsten carbide.

Crystalline ceramic materials are not amenable to a great range of processing. Methods for dealing with them tend to fall into one of two categories—either make the ceramic in the desired shape, by reaction in situ, or by "forming" powders into the desired shape, and then sintering to form a solid body. Ceramic forming techniques include shaping by hand (sometimes including a rotation process called "throwing"), slip casting, tape casting (used for making very thin ceramic capacitors, e.g.), injection molding, dry pressing, and other variations. Details of these processes are known in the art and for brevity are not further described here.

Noncrystalline ceramics, being glass, tend to be formed from melts. The glass is shaped when either fully molten, by casting, or when in a state of toffee-like viscosity, by methods such as blowing into a mold. If later heat treatments cause this glass to become partly crystalline, the resulting material is known as a glass-ceramic, widely used as cooktop and also as a glass composite material for nuclear waste disposal.

In various example embodiments the ceramic used was common terra cotta or bisque-fired ceramic, comprising crystalline silica (quartz) 10-30%, also known as Hydrous Aluminum Silicate. A prototype was constructed using slip-casting which requires pouring liquid silicates or clay into a porous mold, as is known in the field of ceramics. Alternatively, ceramic bodies could be manufactured using both a press-mold function and plunge forming the clay silicate of appropriate plasticity onto a non-porous conical form of predetermined angle so as to release with sufficient ease after introduction of the halved portions also consisting of non-porous material. In process design it is necessary to accommodate the approximate 10-12% shrinkage due to moisture loss. Glazing of the exterior surfaces can be accomplished by known glazing steps. In one example embodiment the glaze used comprised Silica (quartz) 1-3%, Calcium Carbonate 0-3%, Frit (lead free) 21-55%, Kaolin (clay) 2-7%, Zinc oxide 0-1%, Carboxymethylcellulose 0-1½%, Nepheline syenite 0-13%, Zirconium silicate 0-7%, and a variable percentage of water. After this glaze was applied to exterior surfaces, the material was re-fired, or subjected to at least 1800 degrees Fahrenheit, in order to introduce a transparent glaze, or glasslike coating, to the outer surfaces. These are just examples of materials and methods that can be used and do not limit the invention unless specifically claimed.

Any of the suitable technologies set forth and incorporated herein may be used to implement various example aspects of the invention as would be apparent to one of skill in the art. Although exemplary embodiments and applications of the invention have been described herein including as described above and shown in the included example FIGS., there is no intention that the invention be limited to these exemplary embodiments and applications or to the manner in which the exemplary embodiments and applications operate or are described herein. Indeed, many variations and modifications to the exemplary embodiments are possible as would be apparent to a person of ordinary skill in the art. The invention may include any device, structure, method, or functionality, as long as the resulting device, system or method falls within the scope of one of the claims that are allowed by the patent office based on this or any related patent application.

What is claimed is:

1. A drip containment apparatus, comprising:
   a ceramic body having a glazed exterior surface defining an external profile and an unglazed interior surface defining a cavity therein, and an aperture defining an opening from the exterior surface to the interior surface, the aperture and interior surface adapted to receive therein a distal portion of a funnel and to support the funnel so that residual fluid inside the funnel will tend to drip into the interior of the ceramic body and be absorbed into the ceramic body but not leak through the glazed exterior surface;
   the ceramic body comprising a longitudinally extending base and a neck extending outward from the base at a non-right angle relative to the base, the neck comprising the aperture and the cavity.

2. The drip containment apparatus of claim 1, further comprising:
   the ceramic body adapted to be hung on a wall during use with the longitudinally extending base against the wall and the neck angled upward and adapted to support the funnel.

3. The drip containment apparatus of claim 1, further comprising:
   the ceramic body comprising an ornamental shape.

4. The drip containment apparatus of claim 1, further comprising:
   the external profile of the ceramic body defining a longitudinally-extending cylinder portion with a substantially round aperture formed in an upper surface thereof.

5. The drip containment apparatus of claim 4, further comprising:
   the interior surface being substantially round and defining a longitudinally-extending hollow cylinder portion within the ceramic body.

6. The drip containment apparatus of claim 5, further comprising:
   the aperture and the interior surface having substantially the same profile.

7. A method of containing drips, comprising the steps of:
   providing a ceramic body having a glazed exterior surface defining an external profile and an unglazed interior surface defining a cavity therein, and an aperture defining an opening from the exterior surface to the interior surface, the aperture and interior surface adapted to receive therein a distal portion of a funnel so that residual fluid inside the funnel will tend to drip into the interior of the ceramic body and be absorbed into the ceramic body but not leak through the glazed exterior surface;
   providing a funnel containing residual fluid that tends to drip from a distal portion of the funnel;
   hanging the ceramic body on a wall; and
   while the ceramic body is hanging on the wall, placing the distal portion of the funnel through the aperture and into the cavity so that the residual fluid tends to drip from the distal portion of the funnel into the cavity.

8. The method of claim 7, further comprising the steps of:
   positioning the funnel so that it is supported by the ceramic body.

9. The method of claim 7, further comprising the steps of:
   positioning the funnel so that it is supported by the aperture and the interior surface of the ceramic body.

10. The method of claim 7, further comprising the steps of:
    recycling the ceramic body when it becomes substantially saturated by firing the ceramic body under glazing conditions to boil off the residual fluid; and
    reusing the recycled ceramic body by repeating the steps in claim 7.

* * * * *